June 28, 1927.

G. C. SCHIMPF

DROSS FURNACE

Filed Nov. 23, 1925

1,634,217

Inventor
George C. Schimpf
By Robert Wilson
Attorney

Patented June 28, 1927.

1,634,217

UNITED STATES PATENT OFFICE.

GEORGE C. SCHIMPF, OF BALTIMORE, MARYLAND, ASSIGNOR TO HARRY D. HARVEY, OF BALTIMORE, MARYLAND.

DROSS FURNACE.

Application filed November 23, 1925. Serial No. 70,809.

This invention relates to a furnace for melting the dross which collects on the surface of the molten type metal in the melting pots used in printing offices. This dross is oxidized metal which cannot be used except by heating it in a furnace in conjunction with a suitable flux which causes the metal particles to fuse. In carrying out the invention, I provide a suitably heated melting pot having an inlet at the top, for inserting the dross, and a valve controlled outlet at the bottom for drawing off the molten metal, and I also provide means for admitting a suitable liquid flux into the melting pot. I also arrange a vertical shaft in the pot, having blades which are in the form of propeller blades, and a motor is provided for rotating the shaft. A great deal of the dross is in the form of fine powder and unless the flux is brought into intimate contact with the particles of powder, the metal will not fuse. The purpose of the propeller blades, therefore, is to stir the mass and cause this intimate mixture of the flux with the dross, and also to cause the heat to be distributed more quickly throughout the mass.

In the accompanying drawing.

Figure 1:
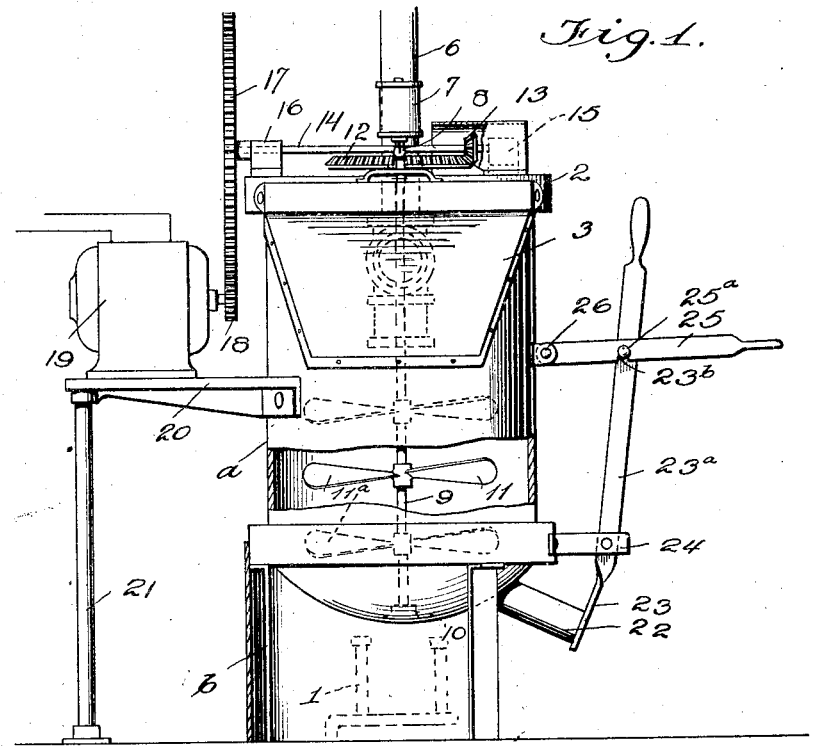
Fig. 1 is a front elevation of the dross furnace, partly broken away.
Figure 2:
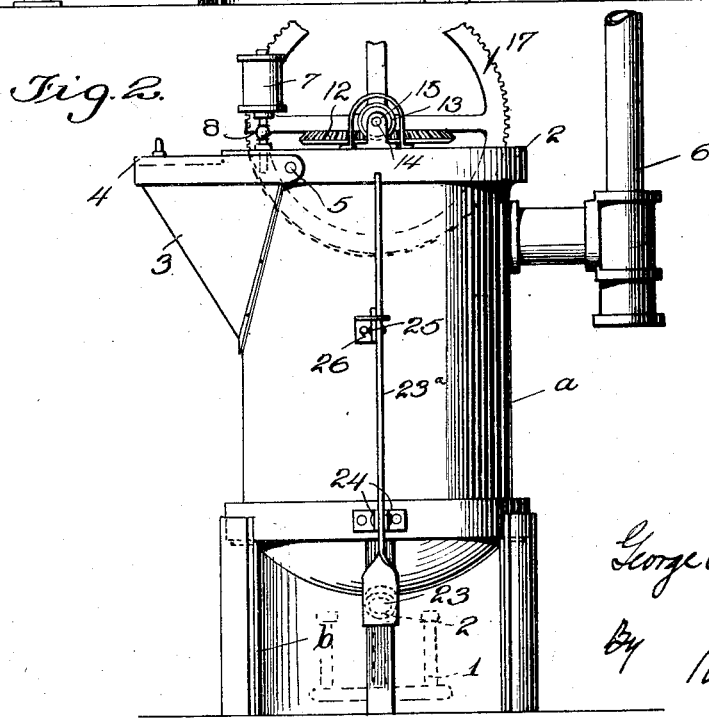
Fig. 2 is a side elevation of the same.

In the drawing, $a$ indicates the melting pot of the furnace, which is of cylindrical form and supported in upright position by the wall of the heating chamber $b$, in which latter are arranged suitable burners 1. The top of the melting pot is closed by a cover 2, and at the forward side of the melting pot, near the top, is a hopperlike fitting 3 through which the dross may be dumped into the furnace. This fitting has a lid 4, hinged at 5 to the cover of the melting pot. A vent pipe 6 is connected to the rear of the melting pot, near its upper end, and is adapted to carry off the fumes which may arise from the melting of the dross. A receptacle 7, for containing liquid flux, is supported on the cover plate, and a valve 8, in the stem of this receptacle, controls the admission of flux to the melting pot.

A shaft 9 is centrally arranged within the melting pot and has a bearing 10 at the bottom of the pot, and also a bearing in the cover plate. This shaft carries a suitable number of propeller blades 11, $11^a$, for stirring the dross. A large bevel gear 12 is secured to the upper end of the shaft and this is in mesh with a small pinion 13, upon a shaft 14, which latter extends horizontally over the bevel gear and is journaled in bearings 15 and 16, near the opposite edges of the cover. The shaft 14 carries a large spur gear 17, which meshes with a pinion 18 on the shaft of an electric motor 19. The motor is mounted upon a bracket 20, secured to the side of the melting pot and supported at its outer edge by a standard 21. When the motor is in operation, the vertical shaft 9 will be rotated at a relatively slow rate of speed through the gearing described.

At the lower end of the melting pot, an outlet pipe 22 is arranged and the end of this pipe may be opened or closed by a flat valve 23, upon the end of a valve lever $23^a$. This lever is pivoted between two parallel metal strips 24 which are secured to the wall of the furnace. The lever projects upwardly and is provided with a laterally projecting pin $23^b$, adapted to engage a notch $25^a$ in a locking lever 25 which is hinged to the wall of the melting pot at 26. By lifting the lever 25, the lever $23^a$ may be rocked to move the valve 23 away from the end of the outlet pipe 22, to permit the metal to flow out, and by moving the valve against the outlet and dropping the lever 25, the valve will be held in the closed position.

In the operation of the furnace, the dross is inserted through the hopperlike fitting 3, and a suitable flux is admitted to the melting pot from the receptacle 7. The heat being applied, the motor is started and the dross and flux are intimately mixed by the operation of the propeller blades, and the heat is evenly distributed through the mass by the stirring operation. The dross soon fuses and the molten metal may then be drawn off through the outlet pipe 22 into suitable molds. Any fumes generated in the melting pot by the heating of the flux will be carried off through the pipe 6.

What I claim is:

In a furnace for melting type metal dross, a melting pot having a hopper at one side, near the top, for the admission of dross, a cover extending over the furnace, a lid for said hopper, hinged to said cover, a shaft arranged vertically in the pot and extending through the cover, said shaft having blades at its lower end, a horizontally arranged shaft geared to said vertical shaft, bearings on the cover in which said horizontal shaft is mounted, and means for driving said latter shaft.

In testimony whereof I hereunto affix my signature.

GEORGE C. SCHIMPF.